(12) United States Patent
Osada et al.

(10) Patent No.: US 10,137,571 B2
(45) Date of Patent: Nov. 27, 2018

(54) OPERATION CONTROL SYSTEM AND OPERATION CONTROL METHOD

(71) Applicant: HONDA MOTOR CO., LTD., Tokyo (JP)

(72) Inventors: Masahiko Osada, Saitama (JP); Yoshiki Kanemoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 15/353,421

(22) Filed: Nov. 16, 2016

(65) Prior Publication Data

US 2017/0197312 A1 Jul. 13, 2017

(30) Foreign Application Priority Data

Jan. 12, 2016 (JP) .................................. 2016-003538

(51) Int. Cl.
*B25J 9/16* (2006.01)

(52) U.S. Cl.
CPC ........... *B25J 9/1666* (2013.01); *B25J 9/1633* (2013.01); *B25J 9/1676* (2013.01); *G05B 2219/40552* (2013.01)

(58) Field of Classification Search
CPC ........ B25J 9/101; B25J 9/1666; B25J 9/1676; B25J 9/1633; G05G 5/04; G05B 2219/37549; G05B 2219/43077; H02H 7/085; H02H 7/0851
See application file for complete search history.

(56) References Cited

U.S. PATENT DOCUMENTS

2010/0278623 A1* 11/2010 Blank ..................... B25J 9/101
  414/749.1
2012/0061155 A1* 3/2012 Berger ..................... B25J 5/007
  180/21

FOREIGN PATENT DOCUMENTS

JP   S63-077692   4/1988

* cited by examiner

*Primary Examiner* — Adam R Mott
(74) *Attorney, Agent, or Firm* — Rankin, Hill & Clark LLP

(57) ABSTRACT

Provided are an operation control system and an operation control method for a movable member, which allow the movable range of the movable member to be utilized to the maximum while deformation of a mechanical element is prevented or reduced. An operation control system 1 includes: a movable member 26 having first mechanical elements 261, 262; an actuator 25 which moves the movable member 26 at a variable velocity; and a second mechanical element 27 which is fixed at a position so as to be capable of making contact with the first mechanical elements 261, 262. When the position and the velocity of the first mechanical element 261 or 262 depart from a predetermined allowable range in a two-dimensional coordinate system expressed by a position and a velocity, a stop instruction is outputted to the actuator 25.

6 Claims, 4 Drawing Sheets

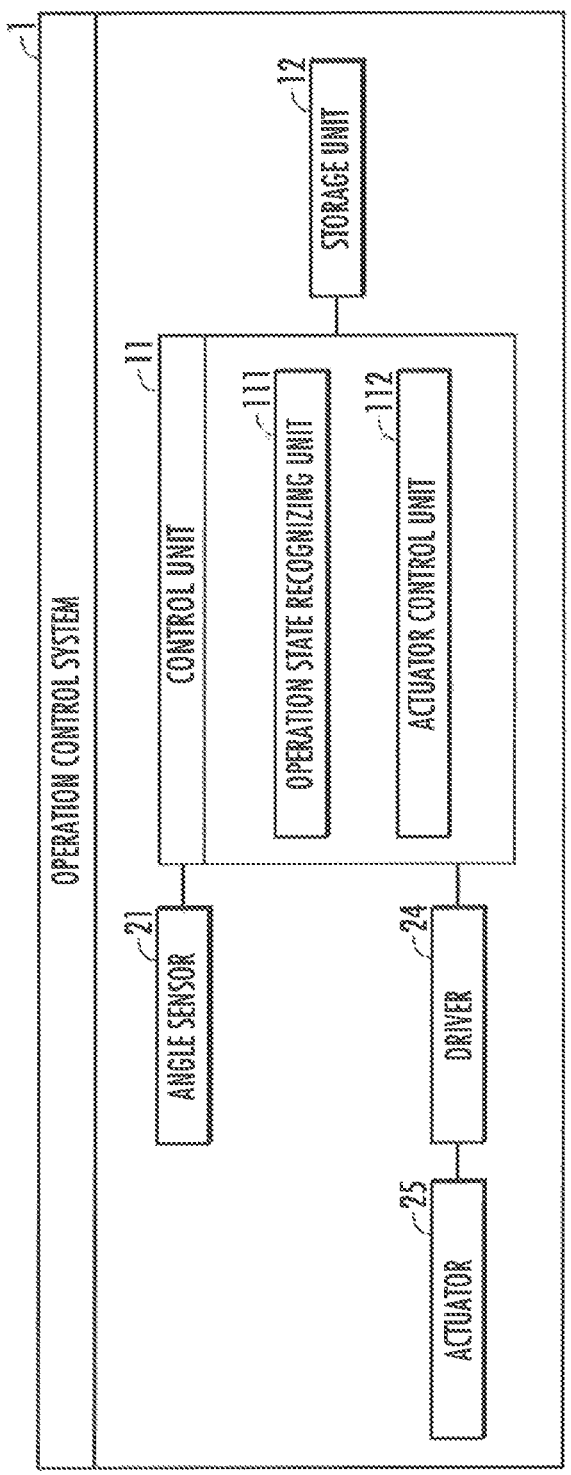

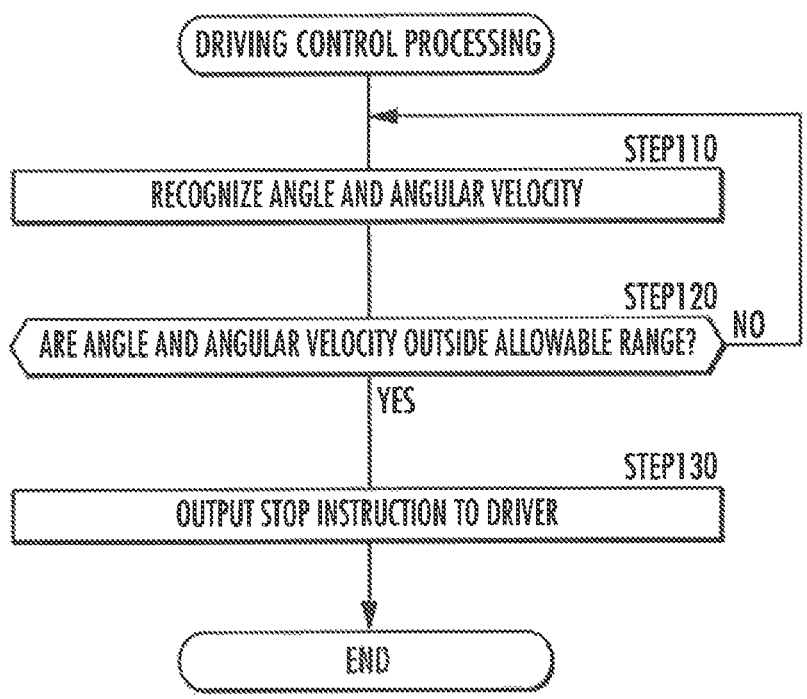

OPERATION CONTROL SYSTEM AND OPERATION CONTROL METHOD

BACKGROUND OF THE INVENTION

Field of the Invention

The present invention relates to a system and a method of controlling an operation of a movable member the movable range of which is limited by a mechanical element.

Description of the Related Art

Techniques in industrial robots are conventionally known in which mechanical stoppers (mechanical elements) placed at ends of operation ranges of arms (movable members) on each of the joint parts are used for limiting the operation ranges (for example, see Japanese Patent Laid-Open No. S63-77692).

Japanese Patent Laid-Open No. S63-77692 proposes a control device in which while the arrangement position of a mechanical stopper placed on a robot joint part is variable, a rotational angle between a predetermined position in the operational range of an arm and the arrangement position of the mechanical stopper is measured, positional data of a software limit is calculated on the basis of the measurement value obtained by the angle measuring means, and a motor is stopped, when the measurement value of the rotational angle of the arm exceeds the positional data.

However, in the technique disclosed in Japanese Patent Laid-Open No. S63-77692, the software limit stops the rotation of the arm such that a mechanical stopper on the arm does not make contact with the mechanical stopper placed at the robot joint part. Accordingly, the arm operation range is narrower than a hardware limitation which is defined by the mechanical stoppers.

Meanwhile, without a limit provided by the software limit, contact between the mechanical stopper of the arm and the mechanical stopper of the robot joint part may occur to cause not only deformation of any of the mechanical stoppers but also damage to the actuator.

In view of the above problems, an object of the present invention is to provide an operation control system or an operation control method for a movable member, which allow the movable range of the movable member to be utilized to the maximum while preventing or reducing deformation of a mechanical element.

SUMMARY OF THE INVENTION

An operation control system of the present invention includes: a movable member having a first mechanical element an actuator which moves the movable member at a variable velocity; a second mechanical element which is configured separately from the movable member and which is fixed at a position so as to be capable of making contact with the first mechanical element; an operation state recognizing unit which recognizes an operation state including a position and a velocity of the first mechanical element; and an actuator control unit that outputs to the actuator a stop instruction for stopping an operation of the actuator in a case where the position and the velocity of the first mechanical element recognized by the operation state recognizing unit depart from a predetermined allowable range in a two-dimensional coordinate system expressed by a position and a velocity.

After the operation of the actuator is stopped, the movable member continues to move by an inertia force but the movable member is deaccelerated by a constant resistance force applied to the movable member by the actuator. Therefore, a force generated against the first mechanical element (or the second mechanical element) when the first mechanical element makes contact with the second mechanical element can be predicted from the position and the velocity of the first mechanical element at a time point of the stop of the actuator operation.

According to the operation control system configured as above by considering the above fact, in a case where the position and the velocity of the first mechanical element depart from the predetermined allowable range, a stop instruction for stopping the operation of the actuator is outputted. As a result, the operation of the actuator is stopped and the movable member is deaccelerated. Thus, the first mechanical element is prevented from making contact with the second mechanical element. Alternatively, even when the first mechanical element makes contact with the second mechanical element, a force generated against the first mechanical element (or the second mechanical element) at a time of contact between the first mechanical element and the second mechanical element is prevented from being excessively large. In this way, while deformation of the first mechanical element and the second mechanical element is prevented or reduced, the movable range of the movable member can be utilized to the maximum.

In the operation control system of the present invention, it is preferable that in a case where: a contact position of the first mechanical element at which the first mechanical element is in contact with the second mechanical element fixed at a position so as to be capable of making contact with the first mechanical element, is zero; a position of the first mechanical element at which the first mechanical element is spaced from the second mechanical element, is positive; and a velocity at which the first mechanical element moves toward the second mechanical element is a negative velocity, at least a part of a boundary of the allowable range is formed by a function providing a negative value range and a negative primary differential in a certain definite domain in which a position is zero or not less than a predetermined positive value, and a velocity equal to or lower than the value of the function in the domain falls outside the allowable range.

In the operation control system configured as above, the function providing a negative value range and a negative primary differential in the certain definite domain in which a position is zero or not less than the predetermined positive value means a function in which as the value of the position of the first mechanical element becomes smaller (the distance between the first mechanical element and the second mechanical element becomes smaller), the absolute value of the velocity of the first mechanical element becomes smaller (the absolute value of a velocity at which the first mechanical element moves toward the second mechanical element becomes smaller).

The velocity lower than the value of the function in the domain means that the absolute value of the velocity at which the first mechanical element moves toward the second mechanical element is greater than the absolute value of the value of the function in the domain.

According to the operation control system of the present invention, when the velocity of the first mechanical element is equal to or less than the value of the function corresponding to the position of the first mechanical element (the absolute value of the velocity at which the first mechanical element moves toward the second mechanical element is equal to or greater than the absolute value of the value of the function corresponding the position of the first mechanical element), the actuator control unit outputs an instruction for stopping the operation of the actuator. As a result, the operation of the actuator is stopped and deceleration of the movable member is started.

Here, as the position of the first mechanical element is closer to the contact position relative to the second mechanical element, the absolute value of the value of the function becomes smaller. Accordingly, the absolute value of the velocity of the first mechanical element at a timing for the actuator control unit to stop the operation of the actuator is expected to be smaller as the position of the first mechanical element is closer to the contact position. As a result of this, a force generated against the first mechanical element (or the second mechanical element) when the first mechanical element makes contact with the second mechanical element is prevented from being excessively large.

In the operation control system of the present invention, it is preferable that in a case where a predetermined conditional expression is established which uses a position and a velocity of the first mechanical element, a collision time, a component indicating an allowable force which is allowable for the first mechanical element or the second mechanical element, a component indicating a resistance force applied to the movable member by the actuator, and a component indicating an inertia force applied to the first mechanical element, the actuator control unit determines that the position and the velocity of the first mechanical element are within the allowable range.

According to the operation control system configured as above, on the basis of consideration of the allowable force for the first mechanical element or the second mechanical element, whether the position and the velocity are within the allowable range is determined. Accordingly, the allowable range can be appropriately set from a viewpoint for preventing deformation of the first mechanical element and the second mechanical element.

In the operation control system configured as above, it is preferable that the actuator is configured to rotate the movable member about a predetermined axis, and the actuator control unit determines that the position and the velocity of the first mechanical element are within the allowable range in a case where an expression (1) as the predetermined conditional expression is established:

$$\theta_{diff} > \frac{I}{2\tau_{brake}}\left(d\theta_{diff}^2 - \left(\frac{\tau_{lim} * \Delta t}{I}\right)^2\right) \qquad (1)$$

wherein $\Delta t$ represents a collision time; $\tau_{lim}$ represents, as the component indicating the allowable force, a torque which is the smaller of a torque allowable for the first mechanical element and a torque allowable for the second mechanical element; $\theta_{diff}$ represents, as the position of the first mechanical element, an angle, about the predetermined axis, formed by a surface of the first mechanical element facing the second mechanical element and a surface of the second mechanical element facing the first mechanical element; $d\theta_{diff}$ represents, as the velocity of the first mechanical element, an angular velocity of the first mechanical element relative to the second mechanical element; $\tau_{brake}$ represents, as the component indicating the resistance force, a resistance torque applied to the movable member by the actuator after the actuator is stopped; and I represents, as the component indicating the inertia force, an inertia of the first mechanical element.

According to the operation control system configured as above, when the angle $\theta_{diff}$ and the angular velocity $d\theta_{diff}$ depart from the allowable range expressed by the condition (1), the actuator control unit outputs an instruction for stopping the operation of the actuator. Thus, a torque generated at a time of contact between the first mechanical element and the second mechanical element can be suppressed to be not greater than the torque (allowable torque) $\tau_{lim}$ allowable for both the first mechanical element and the second mechanical element.

Since the torque applied to the first mechanical element (or the second mechanical element) accordingly falls within the allowable range, the movable range of the movable member can be utilized to the maximum while deformation of the first mechanical element or the second mechanical element is prevented or reduced.

In the operation control system having the above configuration, it is preferable that $\tau_{lim}$ is a value less than both of a shearing load of the first mechanical element and a shearing load of the second mechanical element.

According to the operation control system configured as above, the torque $\tau_{lim}$ generated against the first mechanical element and the second mechanical element at a time of contact between the first mechanical element and the second mechanical element is smaller than both the shearing load of the first mechanical element and the shearing load of the second mechanical element. As a result, damage to the first mechanical element or the second mechanical element due to the torque $\tau_{lim}$ is prevented.

In the operation control system of the present invention, it is preferable that the actuator is configured to cause translation motion of the movable member, and the actuator control unit determines that the position and the velocity of the first mechanical element are within the allowable range in a case where an expression (2) as the predetermined conditional expression is established:

$$D_{diff} > \frac{m}{2F_{brake}}\left(V_{diff}^2 - \left(\frac{F_{lim} * \Delta t}{m}\right)^2\right) \qquad (2)$$

wherein $\Delta t$ represents a collision time; $F_{lim}$ represents, as the component indicating the allowable force, a force which is the smaller of a force allowable for the first mechanical element and a force allowable for the second mechanical element; $D_{diff}$ represents, as the position of the first mechanical element, a distance between a surface of the first mechanical element facing the second mechanical element and a surface of the second mechanical element facing the first mechanical element; $V_{diff}$ represents, as the velocity of the first mechanical element, a velocity of the first mechanical element relative to the second mechanical element; $F_{brake}$ represents, as the component indicating the resistance force, a resistance force applied to the movable member by the actuator after the actuator is stopped; and m represents a mass of the first mechanical element.

According to the operation control system configured as above, when the distance $D_{diff}$ and the angular velocity $V_{diff}$ depart from the allowable range expressed by the condition (2), the actuator control unit outputs an instruction for stopping the operation of the actuator. Thus, a force generated at a time of contact between the first mechanical element and the second mechanical element can be suppressed to be not greater than the force (allowable force) $F_{lim}$ allowable for both the first mechanical element and the second mechanical element.

Since the force applied to the first mechanical element (or the second mechanical element) accordingly falls within the allowable range, the movable range of the movable member can be utilized to the maximum while deformation of the first mechanical element or the second mechanical element is prevented or reduced.

BRIEF DESCRIPTION OF THE DRAWINGS

FIG. 1 is a diagram illustrating an entire configuration of an operation control system of the present embodiment;

FIG. 3 is a flowchart of driving control processing;

DETAILED DESCRIPTION OF THE REFERRED EMBODIMENTS

Figure 2A:
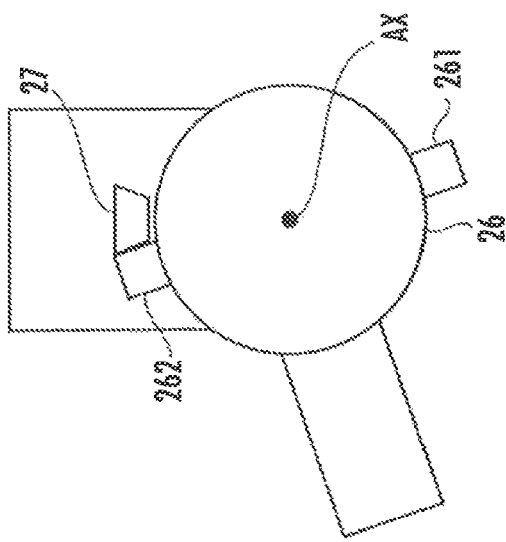
FIG. 2A to FIG. 2C are diagrams in which FIG. 2A relate to a state where none of arm-side mechanical stoppers is in contact with a robot-side mechanical stopper, FIG. 2B relates to a state where a first arm-side mechanical stopper is in contact with the robot-side mechanical stopper, and FIG. 2C relates to a state where a second arm-side mechanical stopper is in contact with the robot-side mechanical stopper.

An embodiment of the present invention is described with reference to FIGS. 1 to 5.

An operation control system 1, which is mounted on, for example, a robot (not illustrated), outputs an instruction to an actuator 25 provided in the robot thereby moving an arm 26 (see FIG. 2), as a movable member, of the robot. The operation control system 1 does not need to be actually mounted on the robot. For example, the operation control system 1 may output an instruction to the actuator 25 through wireless or wired communication.

The operation control system 1 of the present invention is applicable to, in addition to robots, machines including industrial machines in which movable members such as arms thereof are moved by actuators and the movable ranges of the movable members are limited by mechanical elements such as mechanical stoppers.

As illustrated in FIG. 1, the operation control system 1 includes a control unit 11, a storage unit 12, an angle sensor 21, a driver 24, and an actuator 25.

The control unit 11 is configured of a processor, such as a central processing unit (CPU), a physics processing unit (PPU), or the like.

The control unit 11 reads a predetermined program from the storage unit 12 and executes the program to function as an operation state recognizing unit 111 and an actuator control unit 112.

The operation state recognizing unit 111 recognizes a time series angle on the basis of a signal inputted from the angle sensor 21, and recognizes (calculates) a latest angle and a latest angular velocity from the time series angle. Alternatively, the operation state recognizing unit 111 may recognize the angle and angular velocity of the arm 26, for example, on the basis of a signal inputted from the angle sensor 21 and an angular velocity sensor which are provided at the robot.

The actuator control unit 112 outputs, to the actuator 25, an instruction for driving or stopping the actuator 25, via the driver 24 provided at the robot.

For example, when the actuator 25 is a servomotor, an instruction for driving the actuator 25 may be an instruction for indicating an electric power amount to be supplied to the actuator, or may be an instruction for indicating a torque instruction value. For example, when the actuator 25 is a servomotor, an instruction for stopping the actuator 25 may be an instruction for stopping power supply to the actuator, or may be an instruction for setting the torque instruction value to zero.

The storage unit 12 is composed of a storage device such as an HDD and a memory (e.g., a RAM and a ROM), and is configured to store various types of information. The storage unit 12 is configured to be capable of storing and reading data to be used for operation processing executed by the control unit 11.

The angle sensor 21 is configured to output, to the control unit 11, a signal indicating the rotational angle of the arm 26.

The driver 24 is configured to supply, to the actuator 25, electric power corresponding to an instruction from the actuator control unit 112.

The actuator 25 is composed of a servomotor, a solenoid, a power cylinder, a linear actuator, a rubber actuator, etc. The actuator 25 is configured to rotate the arm 26 at a variable angular velocity, about an axis AX illustrated in FIGS. 2A to 2C.

Next, the configuration of the arm 26 as the movable member driven by the actuator 25 is described with reference to FIGS. 2A to 2C.

The arm 26 includes a first arm-side mechanical stopper 261 and a second arm-side mechanical stopper 262. The first arm-side mechanical stopper 261 and the second arm-side mechanical stopper 262 correspond to the "first mechanical element" of the present invention.

The arm 26 is rotatably attached to the robot. In the robot, a robot-side mechanical stopper 27 is fixed at a position so as to be capable of making contact with the first arm-side mechanical stopper 261 and the second arm-side mechanical stopper 262.

Figure 2B:
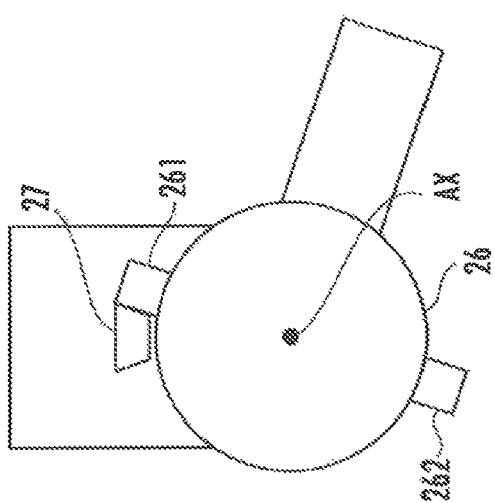
Figure 2C:
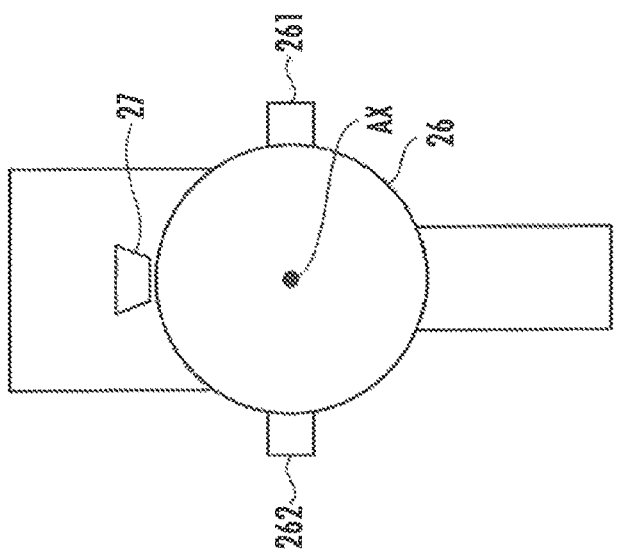

The actuator 25 is configured to rotate the arm 26 about the axis AX at a variable angular velocity from a first contact angle $\theta_{lim1}$ (see FIG. 4) at which the first arm-side mechanical stopper 261 is in contact with the robot-side mechanical stopper 27 as illustrated in FIG. 2B to a second contact angle $\theta_{lim2}$ ($\theta_{lim2} > \theta_{lim1}$, see FIG. 4) at which the second arm-side mechanical stopper 262 is in contact with the robot-side mechanical stopper 27 as illustrated in FIG. 2C. The first contact angle $\theta_{lim1}$ and the second contact angle $\theta_{lim2}$ correspond to the "contact position" of the present invention.

(Driving Control Processing)

Next, driving control processing performed by the control unit 11 is described with reference to FIGS. 3 to 5B.

The operation state recognizing unit 111 recognizes the angle and the angular velocity of the arm 26 on the basis of a signal inputted from the angle sensor 21 (Step 110 in FIG. 3). The angle and the angular velocity of the arm 26 can be recognized to be same as the angle and the angular velocity of the first arm-side mechanical stopper 261 (or the second arm-side mechanical stopper 262). The angle of the arm 26 corresponds to the "position of the first mechanical element" of the present invention, and the angular velocity of the arm 26 corresponds to the "velocity of the first mechanical element" of the present invention. The actuator control unit 112 determines whether the angle and the angular velocity of the arm 26 depart from an allowable range (Step 120 in FIG. 3).

Here, the allowable range is expressed by following expressions (3) and (4).

When $d\theta < 0$, :

$$\theta > \frac{1}{2\tau_{brake}}\left(d\theta^2 - \left(\frac{\tau_{lim} * \Delta t}{I}\right)^2\right) + \theta_{lim1} \quad (3)$$

When $d\theta > 0$, :

$$\theta < \frac{1}{2\tau_{brake}}\left(-d\theta^2 + \left(\frac{\tau_{lim} * \Delta t}{I}\right)^2\right) + \theta_{lim2} \quad (4)$$

wherein: $\Delta t$ represents a collision time; $\tau_{lim}$ represents a force smaller than both the shearing load of the first arm-side mechanical stopper 261 and the shearing load of the robot-side mechanical stopper 27; $\tau_{brake}$ represents a resistance torque applied to the movable member by the actuator when the actuator is stopped; I represents an inertia; $\theta$ represents the angle of the arm 26 (see FIG. 5A); $d\theta$ represents the angular velocity of the arm 26 (see FIG. 5A); and $\theta_{lim1}$ represents the first contact angle.

The collision time $\Delta t$ is obtained by analyzing data imaged by a high speed camera in an experiment.

The resistance torque $\tau_{brake}$ is obtained from the properties of the actuator.

A part of the boundary of the allowable range in this case is expressed by the following functions.

When $d\theta < 0$, :

$$d\theta = -\sqrt{2\tau_{brake}(\theta - \theta_{lim1}) + \left(\frac{\tau_{lim} * \Delta t}{I}\right)^2} \quad (5)$$

When $d\theta > 0$, :

$$d\theta = \sqrt{\left(\frac{\tau_{lim} * \Delta t}{I}\right)^2 - 2\tau_{brake}(\theta - \theta_{lim2})} \quad (6)$$

The function expressed by expression (5) in which $\theta - \theta_{lim1}$ and $d\theta$ are variables corresponds to an example of the "function" of the present invention. The function expressed by expression (6) in which $-(\theta - \theta_{lim2})$ and $d\theta$ are variables corresponds to another example of the "function" of the present invention.

More specifically, the actuator control unit 112 determines that the angle and the angular velocity of the arm 26 fall within the allowable range when the angle and the angular velocity of the arm 26 satisfy expression (3) or (4), and determines that the angle and the angular velocity of the arm 26 are outside the allowable range when the angle and the angular velocity of the arm 26 do not satisfy expressions (3) or (4).

For example, it is assumed that the angular acceleration of the arm 26 is zero, that is, that the first arm-side mechanical stopper 261 (or the second arm-side mechanical stopper 262) of the arm 26 is driven toward the robot-side mechanical stopper 27 at a uniform velocity.

Here, when the first arm-side mechanical stopper 261 moves toward the robot-side mechanical stopper 27, the angular velocity $d\theta$ of the arm 26 is negative.

Figure 4:
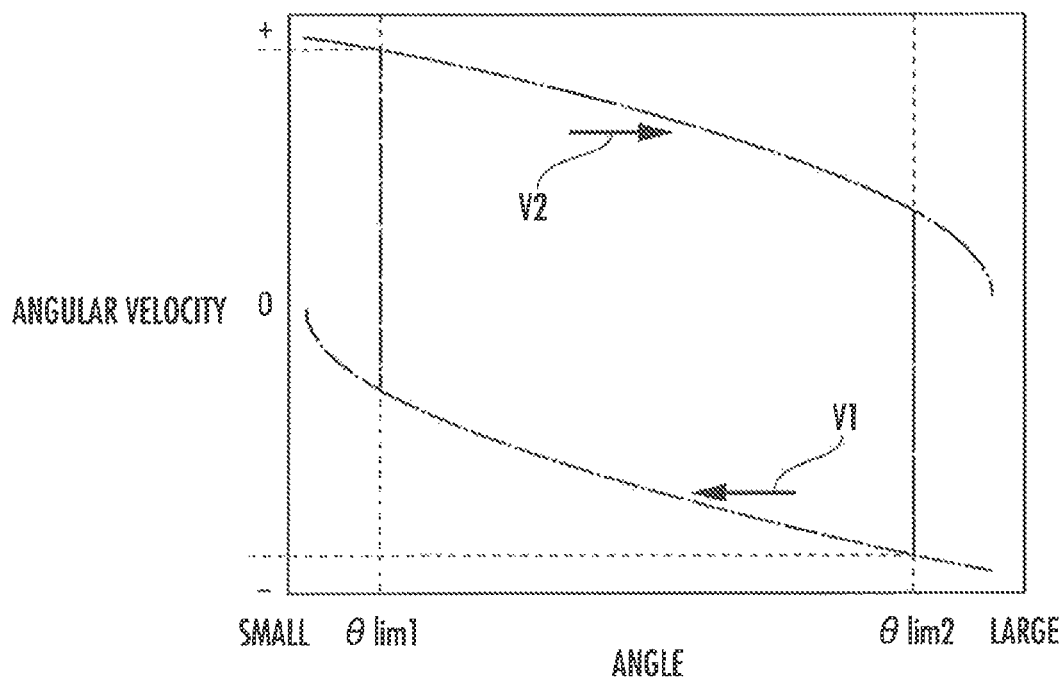
FIG. 4 is a graph showing an allowable range, with the abscissa representing an angle and the ordinate representing an angular velocity

In this case, for example, the angle and the angular velocity of the arm 26 follow a locus represented by an arrow V1 in FIG. 4. Even in a case where the angle and the angular velocity of the arm 26 satisfy expression (3) at a certain time point, the angle and the angular velocity of the arm 26 reach, with lapse of time, the boundary of the allowable range represented by the dashed lines in FIG. 4 to dissatisfy expression (3).

When the second arm-side mechanical stopper 262 is moving toward the robot-side mechanical stopper 27, the angular velocity $d\theta$ of the arm 26 is positive.

In this case, for example, the angle and the angular velocity of the arm 26 follow a locus represented by an arrow V2 in FIG. 4. Even in a case where the angle and the angular velocity of the arm 26 satisfy expression (4) at a certain time point, the angle and the angular velocity of the arm 26 reach, with lapse of time, the boundary of the allowable range represented by the dashed lines in FIG. 4 to dissatisfy expression (4).

When the angle and the angular velocity of the arm 26 dissatisfy expression (3) or expression (4) as described above, the actuator control unit 112 determines that the angle and the angular velocity of the arm 26 are outside the allowable range.

When the determination result at Step 120 in FIG. 3 is negative (No at Step 120 in FIG. 3), the control unit 11 performs the processes of Step 110 and later in FIG. 3, again.

When the determination result at Step 120 in FIG. 3 is positive (Yes at Step 120 in FIG. 3), the actuator control unit 112 outputs, to the driver 24, an instruction for stopping the operation of the actuator 25 (Step 130 in FIG. 3).

(Effects of Driving Control Processing)

According to the present embodiment, when the angle and the angular velocity of the arm 26 depart from the allowable range, an instruction for stopping the operation of the actuator 25 is outputted and the operation of the actuator 25 is stopped. As a result, the arm 26 is decelerated by the resistance force from the actuator 25.

Figure 5A:
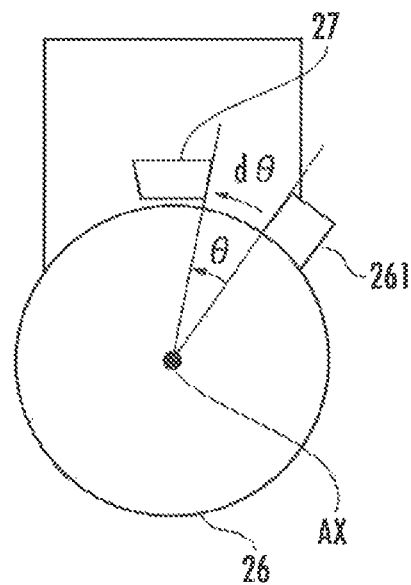
FIG. 5A and FIG. 5B are diagrams in which FIG. 5A relates to the state of an arm in a case where the first arm-side mechanical stopper is moving toward the robot-side mechanical stopper and FIG. 5B relates to a force generated in a case where the first arm-side mechanical stopper makes contact with the robot-side mechanical stopper.
Figure 5B:
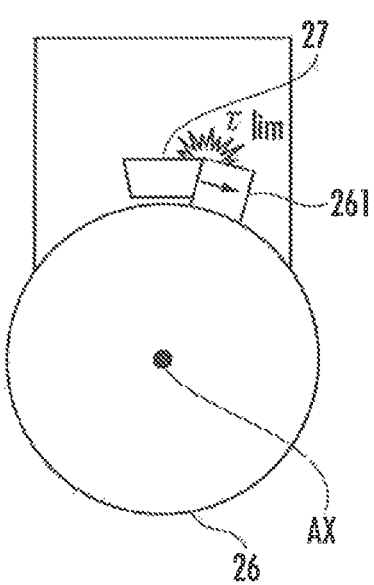

A force generated against the arm-side mechanical stopper (first arm-side mechanical stopper 261 or second arm-side mechanical stopper 262) when the arm-side mechanical stopper makes contact with the robot-side mechanical stopper 27, is approximately $\tau_{lim}$, as illustrated in FIG. 5B. This force is smaller than both the shearing load of the arm-side mechanical stopper and the shearing load of the robot-side mechanical stopper 27 so that damage to the arm-side mechanical stoppers and the robot-side mechanical stopper 27 is prevented. On the other hand, the movable range of the arm 26 can be made maximum because the arm 26 can move until the arm-side mechanical stopper makes contact with the robot-side mechanical stopper 27.

(Modification)

In the present embodiment, the actuator control unit 112 controls the operation of the actuator 25 in the case where the actuator 25 rotates the arm 26 as the movable member. Additionally, or alternatively, the actuator control unit may control the operation of the actuator in a case where the actuator causes translation motion of the movable member.

In this case, it is preferable that the actuator control unit determines that the position and the velocity of the arm-side mechanical stopper are within the allowable range when expression (11) as the predetermined conditional expression is established, and the actuator control unit determines that the position and the velocity of the arm-side mechanical stopper are outside the allowable range when expression (11) as the predetermined conditional expression is not established.

$$D_{diff} > \frac{m}{2F_{brake}}\left(V_{diff}^2 - \left(\frac{F_{lim} * \Delta t}{m}\right)^2\right) \quad (11)$$

wherein: Δt represents a collision time; $F_{lim}$ represents a force which is the smaller of an allowable force for the arm-side mechanical stopper and an allowable force for the robot-side mechanical stopper; $D_{diff}$ represents a distance between the surface of the arm-side mechanical stopper facing the robot-side mechanical stopper and the surface of the robot-side mechanical stopper facing the arm-side mechanical stopper. $V_{diff}$ represents the velocity of the arm-side mechanical stopper relative to the robot-side mechanical stopper; $F_{brake}$ represents a resistance force applied to the movable member by the actuator after the actuator is stopped; and m represents the mass of the arm-side mechanical stopper.

What is claimed is:

1. An operation control system comprising:
a movable member having a first mechanical element;
an actuator which moves the movable member at a variable velocity;
a second mechanical element which is configured separately from the movable member and which is fixed at a position so as to be capable of making contact with the first mechanical element;
an operation state recognizing unit which recognizes an operation state including a position and a velocity of the first mechanical element; and
an actuator control unit that outputs, to the actuator, a stop instruction for stopping an operation of the actuator in a case where the position and the velocity of the first mechanical element recognized by the operation state recognizing unit depart from a predetermined allowable range in a two-dimensional coordinate system, the two-dimensional coordinate system expressed by a position and a velocity,
wherein in a case where a predetermined conditional expression is established which uses a position and a velocity of the first mechanical element, a collision time, a component indicating an allowable force which is allowable for the first mechanical element or the second mechanical element, a component indicating a resistance force applied to the movable member by the actuator, and a component indicating an inertia force applied to the first mechanical element, the actuator control unit determines that the position and the velocity of the first mechanical element are within the allowable range.

2. The operation control system according to claim 1, wherein
in a case where: a contact position of the first mechanical element at which the first mechanical element is in contact with the second mechanical element fixed at a position so as to be capable of making contact with the first mechanical element, is zero; a position of the first mechanical element at which the first mechanical element is spaced from the second mechanical element, is positive; and a velocity at which the first mechanical element moves toward the second mechanical element is a negative velocity,
actuator control unit forms at least a part of a boundary of the allowable range by a function providing a negative value range and a negative primary differential in a certain definite domain in which a position is zero or not less than a predetermined positive value, and a velocity equal to or lower than the value of the function in the domain falls outside the allowable range.

3. The operation control system according to claim 1, wherein
the actuator is configured to rotate the movable member about a predetermined axis, and
the actuator control unit determines that the position and the velocity of the first mechanical element are within the allowable range in a case where an expression (1) as the predetermined conditional expression is established:

$$\theta_{diff} > \frac{I}{2\tau_{brake}}\left(d\theta_{diff}^2 - \left(\frac{\tau_{lim} * \Delta t}{I}\right)^2\right) \quad (1)$$

wherein Δt represents a collision time; $\tau_{lim}$ represents, as the component indicating the allowable force, a torque which is the smaller of a torque allowable for the first mechanical element and a torque allowable for the second mechanical element; $\theta_{diff}$ represents, as the position of the first mechanical element, an angle, about the predetermined axis, formed by a surface of the first mechanical element facing the second mechanical element and a surface of the second mechanical element facing the first mechanical element; $d\theta_{diff}$ represents, as the velocity of the first mechanical element, an angular velocity of the first mechanical element relative to the second mechanical element; $\tau_{brake}$ represents, as the component indicating the resistance force, a resistance torque applied to the movable member by the actuator after the actuator is stopped; and I represents, as the component indicating the inertia force, an inertia of the first mechanical element.

4. The operation control system according to claim 3, wherein
$\tau_{lim}$ is a value less than both a shearing load of the first mechanical element and a shearing load of the second mechanical element.

5. The operation control system according to claim 1, wherein
the actuator is configured to cause translation motion of the movable member, and
the actuator control unit determines that the position and the velocity of the first mechanical element are within the allowable range in a case where an expression (2) as the predetermined conditional expression is established:

$$D_{diff} > \frac{m}{2F_{brake}}\left(V_{diff}^2 - \left(\frac{F_{lim} * \Delta t}{m}\right)^2\right) \quad (2)$$

wherein Δt represents a collision time; $F_{lim}$ represents, as the component indicating the allowable force, a force which is the smaller of a force allowable for the first mechanical element and a force allowable for the second mechanical element; $D_{diff}$ represents, as the position of the first mechanical element, a distance between a surface of the first mechanical element facing the second mechanical element and a surface of the second mechanical element facing the first mechanical element; $V_{diff}$ represents, as the velocity of the first mechanical element, a velocity of the first mechanical element relative to the second mechanical element; $F_{brake}$ represents, as the component indicating the resistance force, a resistance force applied to the movable member by the actuator after the actuator is stopped; and m represents a mass of the first mechanical element.

6. An operation control method which is performed by a system including a movable member having a first mechanical element, an actuator which moves the movable member at a variable velocity, and a second mechanical element configured separately from the movable member and fixed at a position so as to be capable of making contact with the first mechanical element, the method comprising:
   an operation state recognition step of recognizing an operation state including a position and a velocity of the first mechanical element; and
   an actuator stop control step of outputting, to the actuator, a stop instruction for stopping the operation of the actuator in a case where the position and the velocity of the first mechanical element recognized in the operation state recognition step depart from a predetermined allowable range in a two-dimensional coordinate system, the two-dimensional coordinate system expressed by a position and a velocity,
wherein in a case where a predetermined conditional expression is established which uses a position and a velocity of the first mechanical element, a collision time, a component indicating an allowable force which is allowable for the first mechanical element or the second mechanical element, a component indicating a resistance force applied to the movable member by the actuator, and a component indicating an inertia force applied to the first mechanical element, in the actuator stop control step the position and the velocity of the first mechanical element are determined to be within the allowable range.

* * * * *